United States Patent Office 2,778,290
Patented Jan. 22, 1957

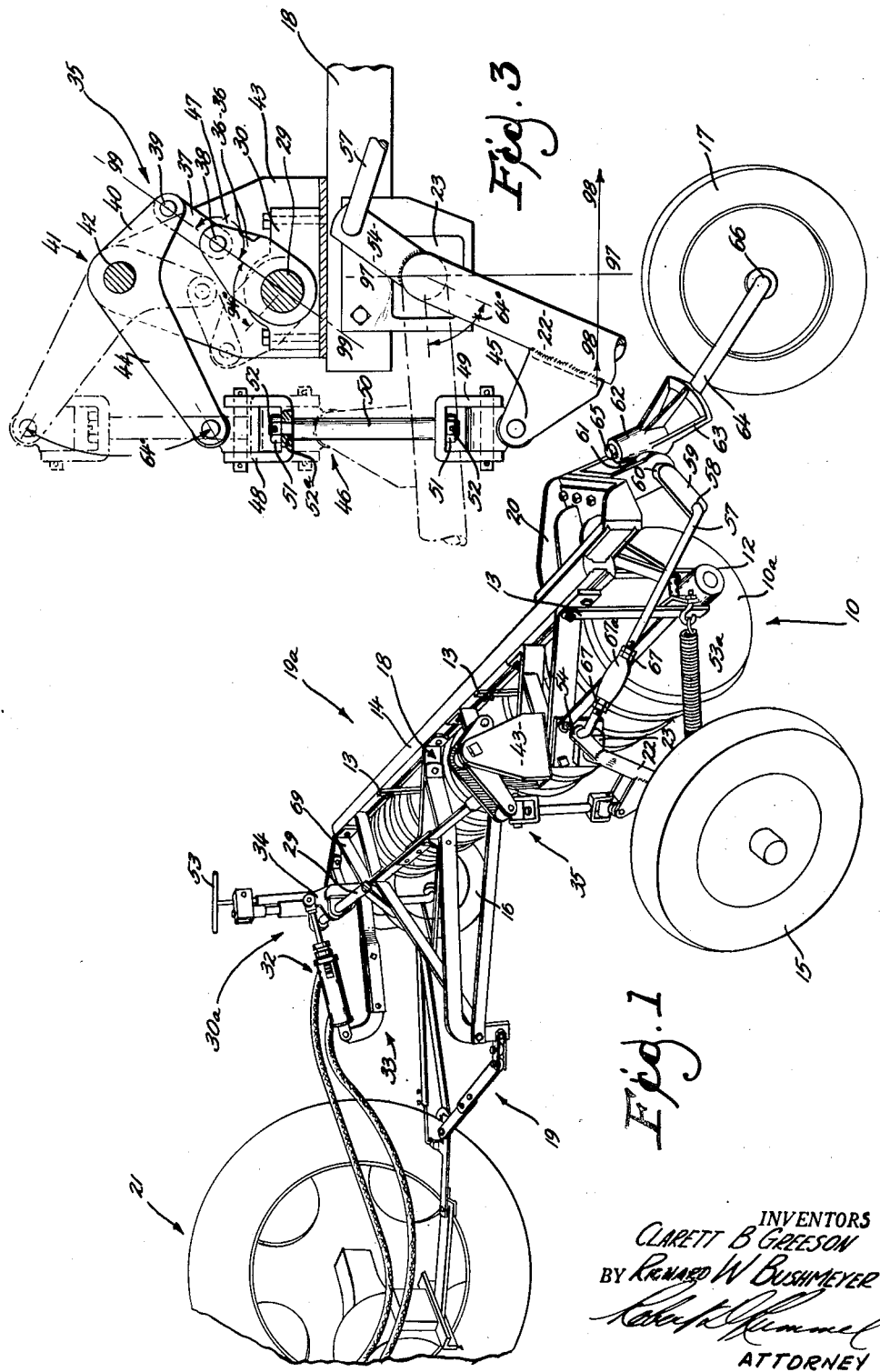

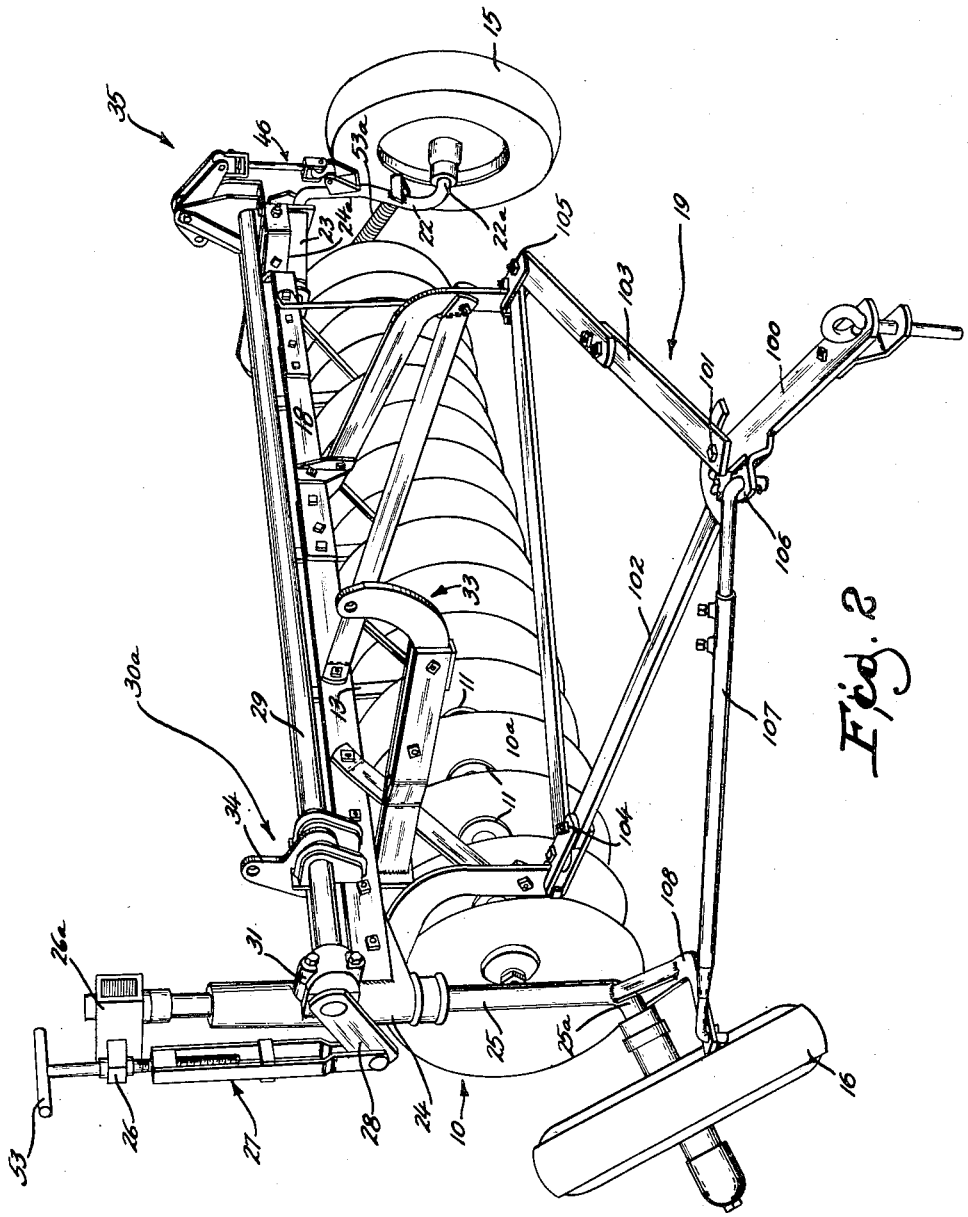

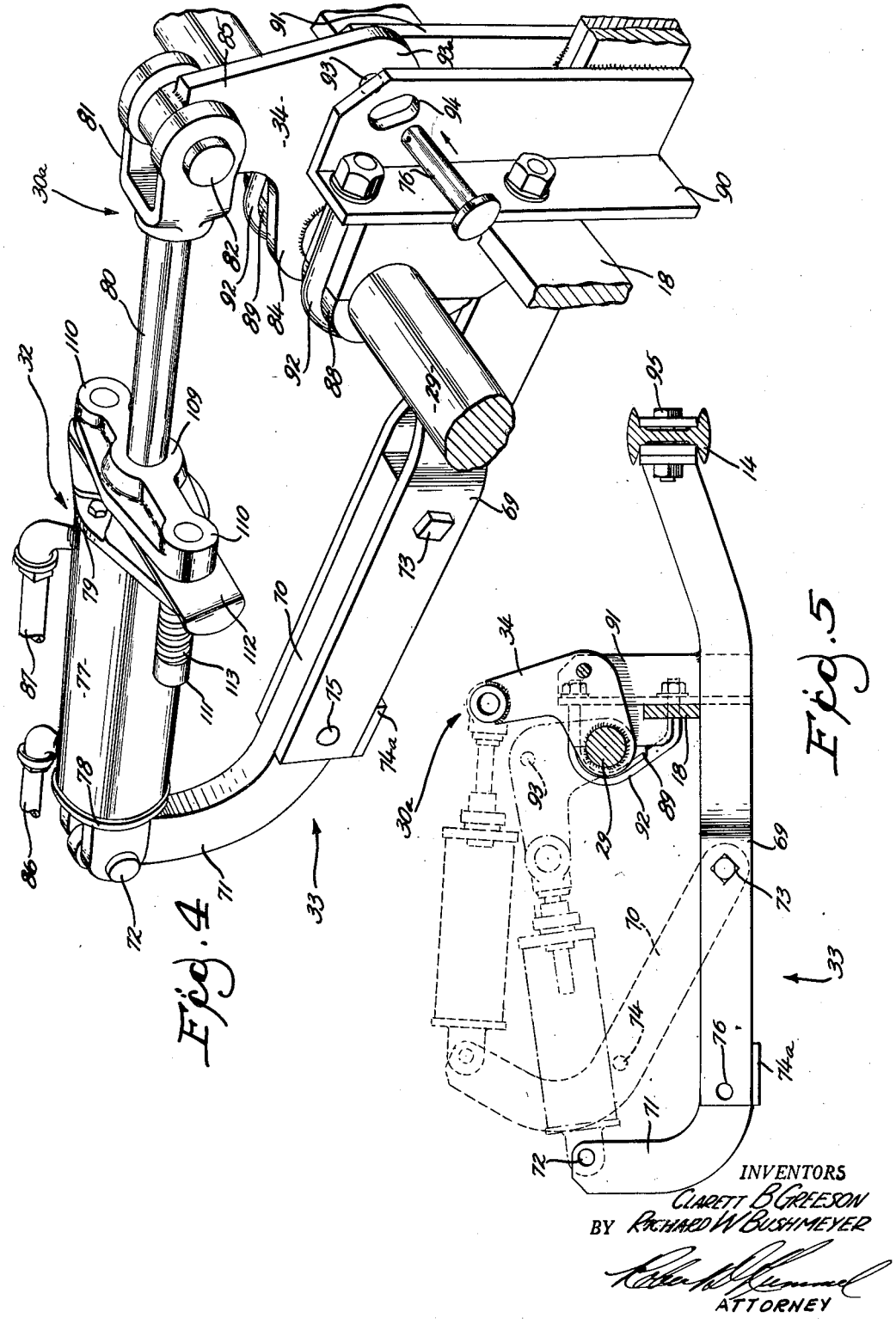

2,778,290

DISK PLOW

Clarett B. Greeson and Richard W. Bushmeyer, Rockford, Ill., assignors to J. I. Case Company, Racine, Wis., a corporation of Wisconsin Application April 19, 1951, Serial No. 221,872

7 Claims. (Cl. 97—46.27)

The invention relates to disk plows of the type characterized by a series of disks arranged in axial alignment, all facing the same direction, and with the common axis of the disks extending at an angle to the line of draft of the implement and a general object thereof is to improve the construction and operation of devices of this class.

A further object of the invention is the provision of new and improved hydraulically operated means for raising or lowering the frame relative to the supporting wheels, which mechanism is preferably operated by means of a power source carried by the tractor. Another important object of this invention is to so position and construct this lifting mechanism with respect to the supporting wheels and the frame that the force exerted to move the frame will produce a couple which will tend to counteract the inherent unbalance tending to twist the frame of a plow of this type and thus materially reduce the stress which may be imposed upon the frame members.

A still further object of this invention is to provide a hydraulically controlled disk plow employing a shaft in torsion for transmitting the desired motion of a hydraulic cylinder to the supporting wheels for raising or lowering the plow.

Another object is the provision of means for locking the disk plow in transport position so that the hydraulic cylinder can be removed for use on other implements.

Still another object is the provision of means whereby the hydraulic cylinder can be mounted on the plow when the plow is locked in a transport position regardless of whether the cylinder is fully extended, partially extended, or fully retracted.

Further objects will become apparent from the following description and accompanying drawings in which a satisfactory embodiment of the invention is shown, but it is to be understood that the invention is not to be taken as limited to the exact construction shown, or in fact in any manner except as herein set forth.

In the drawings:

Fig. 1 is a left-rear perspective view of a disk plow attached to a tractor and embodying the present invention.

Fig. 2 is a right-front perspective view of the plow shown in Fig. 1, enlarged and with parts removed.

Fig. 3 is a left-side elevational view of a portion of the device shown in Fig. 1 enlarged, and showing the linkage for raising the land wheel axle, with parts broken away to show details in construction, showing in dotted lines the position of the linkage and the land wheel axle when the plow is in an operative position.

Fig. 4 is a left-rear perspective view of the hydraulic cylinder, the mounting therefor, and the locking means for locking the plow in a transport position.

Fig. 5 is a left-hand elevation of the ram supporting means showing in dotted lines the ram anchoring portion in a non-operative position, slightly enlarged.

As seen in Figs. 1 and 2 the implement in which the present invention is preferably embodied is in the nature of a disk plow comprising a gang 10 of axially aligned disks 10a axially fixed relatively to spindles 11 which in turn are rotatably supported when the plow is raised for transport in a thrust bearing 12 and in suitable bearings on a plurality of standards 13. The upper ends of the standards 13 are secured to a beam 14 which is supported for movement by means of a land wheel 15, a front furrow wheel 16 and a rear furrow wheel 17, the beam 14 being supported so as to extend in a direction oblique to the path of travel of the implement for engaging the disks 10 with respect to the ground so as to slice the soil in a manner well known in the art. A forwardly projecting framework generally designated at 18 connects with the wheels 15 and 16 to support the beam 14 therefrom. The frame 18 also connects with a drawbar structure 19 of any suitable construction, and together with beam 14 constitutes the main frame 19a for the disk plow. The rear furrow wheel 17 is connected with the beam 14 by means of a frame or bracket 20 as will be explained more fully hereinafter.

The implement is drawn by a conventional tractor or other suitable propelling means 21 in the direction indicated, wheel 16 running in the last previously formed furrow, wheel 17 running in the last furrow being formed, and wheel 15 running on the unplowed ground.

For movably supporting the disks 10a with respect to the ground, the wheel 15 is rotatably carried on a laterally extending portion 22a of a crank axle 22 which is journaled at its other end in a suitable bearing 23 secured to the frame 18 as at 24a while the forward end of the frame 18 has secured thereto a spindle carrying member 24 in which is slidably journaled a spindle 25 which rotatably carries the wheel 16 upon a laterally extending portion 25a thereof. At the upper end of the spindle 25 is pivotally secured an arm 26a having a swivel head 26 to which is secured an adjusting device 27, the lower end of which is connected to an arm 28 secured as by welding or the like to one end of a torsion bar 29 as will be explained hereinafter. As is well known in the art, fore and aft swinging of the crank axle 22 together with a corresponding up or down movement of the spindle 25 in the member 24 in the proper direction will effect movement of the disks 10a with respect to the ground.

For causing movement of the crank axle 22 and the spindle 25 for effecting movement of the disks 10a with respect to the ground, we have provided a hydraulically actuated lifting mechanism generally designated as 30a now to be described. The torsion shaft 29, as previously mentioned, is rotatably supported in bearings 30 and 31, see also Fig. 3, secured respectively to the framework 18 adjacent the crank axle 22 and to the spindle carrying member 24 so as to position the shaft 29 forwardly of the beam 14 substantially parallel and co-extensive therewith. Desired torsional force is applied to the shaft 29 by means of a rock arm 34 and a pressure cylinder 32, of any suitable type, carried by a supporting means 33 as will be clearly described hereinafter (see Fig. 4). The desired motion of the cylinder 32 is transmitted to the spindle 25 and the crank axle 22 by means of the shaft 29 through the arm 28 adjacent the bearing 31 and connected to the spindle 25 by means of the adjusting device 27 and the swivel head 26, and a linkage generally designated as 35, interposed between the shaft 29 adjacent the other end thereof and the axle 22.

More specifically the linkage 35 includes in the present instance aligned spaced actuating arms 36, Fig. 3, fixed adjacent the end of the shaft 29 on opposite sides of the bearing 30. The arms 36 pivotally secure a link 37 between the adjacent ends thereof by means of a suitable pin 38, the link 37 being pivotally secured adjacent its opposite end by means of a suitable pin 39 between rearwardly extending spaced legs 40 of a bell crank 41. The bell crank 41 is swingably secured by means of a suitable pin 42 between aligned brackets 43 which are secured in any suitable manner to the frame 18 so as to laterally enclose the bearing 30 and the actuating arms 36. The bell crank 41 has spaced forwardly extending aligned legs 44 which are universally connected from a point adjacent their forward ends to a suitable pivot arm 45 secured, as by welding or the like, to the crank axle 22 as by a suitable universal connection generally designated as 46. It will be apparent that the relationship between the actuating arms 36 and the link 37 is that of a toggle with the pin 38 acting as the knuckle or knee of said toggle and the angle 47 as the flexion angle. Therefore, when the plow is in a lowered position, the flexion angle 47 is smallest as seen in dotted lines in Fig. 3, and as the shaft 29 is turned in a clockwise direction by means of the cylinder 32, as will be explained hereinafter, the arm 36 and link 37 exert a rearward thrust against the bell crank arm 40, the flexion angle 47 between the arm 36 and the link 37 against the crank arm 40 swings the bell crank 41 counterclockwise so as to exert a rearward and downward thrust against the crank axle 22 which lowers the wheel 15 and consequently raises the plow. It will be apparent from the drawings that the bell crank 41 swings in a plane substantially normal to the shaft 29 so that the legs 44 swing into the plane of movement of the land axle 22. Since in machines of this type, the disks are carried at an angle oblique to the direction of travel of the plow, the plane of movement of the land axle 22 is oblique to the axis of the shaft 29 and consequently to the plane of movement of the bell crank 41. To compensate for the twisting effect imposed upon the connection 46 when the land axle 22 is swung either upwardly or downwardly, the connection 46 is constructed as follows. Suitable universal joints generally designated as 48 and 49 are pivotally secured to the legs 44 of the bell crank 41 and the pivot arm 45 of the axle 22 so as to swing respectively in the plane of movement of the bell crank 41 and in a plane substantially normal thereto, and in the plane of movement of the axle 22 and in a plane substantially normal thereto. The universal joints 48 and 49 are interconnected by a suitable rod 50 which is pivotally secured to the respective universal joints 48 and 49 and held against axial movement relatively thereto by means of castellated nuts or the like 51 fixed against rotation by suitable pins 52 and shoulders as 52a. It will be apparent that when the axle 22 is swung in any desired direction, that the rod 50, because of its swivel nature will prevent any twisting force being imposed upon the universal connection 46.

It is realized that, commonly, it is necessary for the furrow wheel on a plow, during raising movement, to go down relatively to the frame only to the extent that it is desired for the disks to clear the land in raised position. On the other hand, it is necessary for the land wheel to drop this amount plus the plow depth for which the plow is set. This difference in movement is accomplished by choosing the proper length for the arms 36, the link 37, the legs 40 and 44 of the bell crank 41, the distance from the pivot 45 to the axis of the bearing 23, and the size of the arm 28. To more specifically illustrate the expedients for accomplishing the above mentioned well-known principle, suppose in the present instance, a rotation of 94° of the torque shaft 29 is sufficient to move the plow from a raised position to a desired lowered or working position, shown in dotted lines in Fig. 3. The arms 36 will consequently be swung counterclockwise 94° pivoting the bell crank 41 clockwise only 64° due to the length of the legs 40 and 44 and the link 37. The distance between the axis of the pin 42 and the axis of the pivotal connection of the universal joint 48 to the bell crank 41 is substantially equal to the distance between the axis of the bearing 23 and the pivotal connection of the joint 49 to the pivot 45 so that a clockwise swinging movement of the bell crank 41 will effect a movement in the same direction and of a like distance in the pivot arm 45. Since the arc of travel of the axle 22 in the present instance will therefore be substantially equal to 64° the desired movement of the disks can be determined by experiment, taking into account that as the distance between the pivot 45 and the axis of the wheel 15 is increased, the arc of travel of the wheel 15 increases, which as will be apparent, will effect the lowering of the disks with respect to the ground. The arm 28 will be turned in the same direction as the shaft 29 when the shaft is turned 94° so as to move the spindle 25 by means of the arm 26a, the head 26, and the adjusting device 27, the distance moved by the spindle 25 being substantially equal to the vertical chordal distance of the arc of travel of the end of the arm 28. It will be apparent that the movement of the spindle 25 in the member 24 is enough smaller than the movement of the wheel 15 to position the disks 10a substantially parallel to the horizontal when the plow is in a working position. The adjusting device 27 is provided with a suitable handle 53, Figs. 1 and 2, for permitting independent adjustment of the furrow wheel 16 relative to the shaft 29.

A counterbalancing spring 53a is tensioned between the standard 13 adjacent the thrust bearing 12 and the axle 22 to assist the lifting movement of the cylinder 32.

Connections are provided to the rear furrow wheel 17 for changing its position in accordance with swinging of axle 22. The latter has an arm 54 extending generally in a direction opposite to axle 22 as best seen in Fig. 1, which is pivotally connected to one end of a rod 57. The rod 57 is pivotally connected at its opposite end as at 58 to an arm 59 on a rock shaft 60. Rock shaft 60 is fixed with a casting 61 having a bearing portion 62 and a "fish tail" portion 63. A crank axle 64 has a journal portion 65 extending in a generally vertical direction in the bearing 62 for lateral swinging movement of axle 64, and a spindle portion 66 on which is journaled the rear furrow wheel 17. Counterclockwise movement of axle 22, corresponding to a raising movement of the plow, therefore causes a pull on rod 57 and clockwise rocking of rock shaft 60. This depresses casting 61 and accordingly crank axle 64 and wheel 17. The movement of the wheel 17, as will be apparent, has been made less than the movement of wheel 15, since wheel 17 normally travels in the bottom of the last formed furrow and does not need to shift relatively to the beam 14 to as great an extent as the land wheel 15. Furthermore with the land wheel 15 in its raised or plowing position, the arm 54 and the rod 57 are in substantially dead-center relation so that small movements of the axle 22 for adjusting the plowing depth have substantially no effect on the axle 64 and the wheel 17. This is desirable since plowing at various depths, the furrow wheel 17 should remain substantially at the level of the lowest point of the disks 10a. In order to arrive at a suitable position for axle 64 in the first instance, the rod 57 is adjustable in length by any suitable manner, as for example, by nuts 67—67 and a turnbuckle 67a.

For carrying the previously mentioned hydraulically actuated cylinder 32 there is suitably secured with the framework 18 and the beam 14, as will be explained hereinafter the forwardly extending support 33, as previously mentioned. The support 33, see Figs. 4 and 5, includes in the present instance a bifurcated member 69 and a pivot member 70 provided with an upwardly curved portion 71 to form an anchoring or accommodating means for detachably pivotally supporting one end of the cylinder 32 as by a suitable pin or the like 72. The pivot member 70 is pivotally secured in the member 69 by means of a suitable bolt 73 and is provided forwardly with a hole or aperture 74 which when the member 70 abuts a stop 74a, welded or the like on member 69, so as to assume a substantially fore and aft position, becomes in alignment with holes or apertures 75—75 formed in the member 69, whereupon swinging movement of member 70 can be prevented by means of a suitable pin 76 inserted in the aligned holes 74 and 75—75 so that member 70 may form a rigid support for the cylinder 32. The hydraulic ram or cylinder 32 can be of any known or suitable type generally associated with farm tractors and implements and has a cylindrical portion 77 closed at one end by a head 78 and at the other by a head 79. A plunger or piston, not shown, within cylindrical portion 77 is connected with a piston rod 80, slidable in the cylindrical portion 77 by means of fluid pressure carried by suitable connections 86 and 87 opening into opposite ends of the cylindrical portion 77 and connected to the hydraulic pressure source of the tractor in a manner well known in the art. Piston rod 80 is provided with a clevis 81 which is detachably pivotally secured as by a suitable pin 82 to above-mentioned rock arm 34. The rock arm 34, substantially angularly shaped in the present instance, includes a leg 84 secured as by welding or the like to the shaft 29 and a leg 85 pivotally secured as previously mentioned to the clevis 81 of the cylinder 32 so that when the cylinder is expanded, or when piston rod 80 is driven out of cylindrical portion 77, the shaft 29 will rotate or turn in a clockwise direction, as seen in Figs. 4 and 5, with the rock arm 34. The rock arm 34 is fixed to the shaft 29 between suitable bearings 88 and 89 which are carried respectively in brackets 90 and 91 by means of suitable clamps 92, the bearings 88 and 89 withstanding the thrust and pull exerted by the cylinder 32 upon the shaft 29 and preventing bending thereof during lifting operation of the plow. It will be apparent that when the cylinder 32 is expanded, that the shaft 29 is turned in a clockwise direction, as viewed in Figs. 4 and 5, which, as previously mentioned raises the disks 10a with respect to the ground. When the plow is positioned for transport, an opening 93 formed in the offset portion 93a of the rock arm 34 will be in alignment with openings 94—94 formed respectively in the brackets 90 and 91. It will be appreciated that when the rock arm 34 is rocked sufficiently in a clockwise direction to raise the disks 10a into transport position and align opening 93 with openings 94—94, that the forward thrust of the cylinder 32 is sufficient to maintain the pivot member 70 against the stop 74a upon removal of pin 76. Rock arm 34 is then locked against movement by insertion of pin 76 in aligned openings 93 and 94—94 thereby locking the plow in transport position. With the plow locked in transport position the cylinder 32 can be easily removed for use on another implement by relief in well-known manner of any pressure within cylinder 32 and removal of pins 72 and 82, and the plow may be placed in storage. When the operator again desires to use the plow, the hydraulic cylinder can be repositioned thereon, and owing to the pivotal nature of the member 70 when the pin 76 is removed, the cylinder can be mounted on the plow in extended, partially extended, or fully retracted position by securing the clevis of the cylinder to the rock arm by means of pin 82, then swinging the member 70 until the pin 72 can be inserted, and then expanding the cylinder 32 until the member 70 abuts the stop 74a so that the hole 74 of the member 70 becomes in alignment with the holes 75 of the bifurcated member 69. Further expansion of cylinder 32 will relieve the force tending to shear pin 76 sufficiently to enable the operator to remove the pin and reinsert it in aligned openings 74 and 75—75, once again forming a rigid support for cylinder 32.

It will be apparent that the purpose of the linkage system 35 is to rock the bell crank 41 in a reverse direction as compared to the shaft 29. The plow is consequently raised into a transport position on the extending stroke of the cylinder, the forward thrust of the cylinder being transmitted to the spindle 25 and the axle 22 by means of the torque shaft 29. It will be further apparent that the plow is inherently unbalanced, the heavy beam 14 which supports all the disks 10a and carries substantially all the weight, being supported at its left end as related to the direction of movement of the plow between the land wheel 15 and the rear furrow wheel 17 while being relatively unsupported adjacent its right end except for the front furrow wheel 16 which is displaced forwardly of the beam. This condition will normally result in a tendency in the beam 14 to dip or tip toward its unsupported end namely the right end in the present instance, and will introduce a tendency to twist the frame 18 in a direction permitting the right end of the beam to droop. To counteract this tendency so as to maintain the beam 14 and consequently the plow in a balanced condition the cylinder is positioned with respect to the torque shaft 29 so as to produce a couple, when the cylinder is extended for raising the plow into a transport position, tending to twist the frame in the opposite direction and thereby prevent such drooping of beam 14. The member 69 of the cylinder support 33 is rigidly secured by welding between above-mentioned brackets 90 and 91 so as to extend forwardly substantially normal to the framework 18 and the shaft 29. Rearwardly the member 69 extends laterally and is secured adjacent the right end of the beam 14 by means of a bolt 95 or in any suitable manner, see also Fig. 1. When the cylinder 33 is extended so as to raise the plow, a forward thrust substantially equal to the rearward thrust tending to rotate the shaft 29 in a clockwise direction is exerted upon the anchoring portion 71. A rearward thrust substantially equal to the forward thrust is exerted upon the rigid connection between the brackets 90 and 91 and the member 69, this rearward thrust together with the forward thrust exerted upon the anchoring portion 71 constituting a couple which tends to rotate the member 69 about its rigid connection to the brackets 90 and 91 and therefore about shaft 29 in a counterclockwise direction. This tendency, as will be apparent, is transmitted to the beam 14 adjacent its right end tending to lift it and thereby to compensate for the unbalanced nature of the beam 14 and to counterbalance the tendency to twist frame 18. The exact location of the cylinder support 33 with respect to the torque shaft 29 and the beam 14 can best be determined by experiment, consideration being given to the size of the plow, the location of the supporting wheels, and the size and location of the beam 14.

It will be apparent that when the plow is in a raised position, that the axle 22 approaches a vertical center line which passes through the axis of the bearing 23 and designated 97—97 (see Fig. 3). If we assume for the time being that the actuating arms 36 and the connecting link 37 are eliminated and that the shaft 29 is integral with the bell crank 41 at its pivot point, it will be apparent that when the plow is transported at high speed over rough terrain, large forces will be exerted which will tend to rotate the shaft 29 in a counterclockwise direction. More specifically it will be apparent that a horizontal force reaction designated as 98—98 will, because of its favorable moment ratio, create a large torsional load on the shaft 29. If the land axle 22 moves beyond the vertical center line 97—97, which deflection of the shaft 29, preferably formed of steel, might permit, the vertical force reaction on the land axle 22 would produce a moment which would be additive to the moment produced by the horizontal force reaction 98—98. Therefore it is seen from purely theoretical considerations aside from considerations of space limitations that it is desirable to restrict the land axle 22 to its normal position ahead of vertical line 97—97. In the preferred construction illustrated in Fig. 3 we see that the above-described condition cannot occur. It will be apparent that when the plow is in a raised position the actuating arms 36 and the connecting link 37 are in dead center position as designated by the line 99—99 so that a force reaction on the land axle 22 cannot produce a torsional load on the shaft 29. Hence, when the plow is in a raised position, the land axle 22 is virtually locked in position and shaft 29 is relieved from torsional stress, insofar as axle 22 is concerned.

As seen in Fig. 2, the drawbar 19 comprises, in the present instance, a portion 100 pivoted at 101 to links 102 and 103 which are engaged at 104 and 105 respectively with suitable points on the above-mentioned frame 18 in a well-known manner. The portion 100 may swing relatively to links 102 and 103 when the plow is turned and an ear 106 is pivotally connected by a link 107 to an arm 108 fixed with the above-mentioned spindle 25. Swinging of the portion 100 will therefore cause swinging or steering movement of spindle 25 and accordingly of the front furrow wheel or supporting wheel 16. Link member 103 is adjustable in length for varying the line of draft as is well known and link 107 may also be adjusted to obtain proper steering movement after adjusting link 103.

It will now be apparent that expedients have been provided for realizing the objects above set forth, and the operation of the implement is thought to be clear from the above description. Various well-known hydraulic controls are contemplated as adaptable for use with this construction, some of which give accurate control of the position of the plunger within the cylindrical portion 77 of the cylinder 32. With such controls the depth of plowing is readily controlled by merely manipulating the hydraulic controls on the tractor so as to hold the piston in the position necessary to maintain the desired plowing depth. Other hydraulic systems operate in such a manner as to move the plunger 80 the limit of its travel in one direction or the other. This type of system is equally adaptable, an example being that shown in Fig. 4.

In the preferred construction as best shown in Fig. 4, the ram 32 is provided with a limit stop of any well-known form including in the present instance a stop 109 slidable on the plunger 80 and provided with lateral portions 110 which have rods 111 fixed therein. The rods 111 are slidable in the head 79 and the stop 109 is locked in various positions with respect to head 79 by means of a spring loaded latch 112 engageable in circumferential grooves 113 formed in the respective rods 111, the stop 109 abutting the clevis 81 upon the ram's being retracted. As will be apparent various positions of the slidable latch 112 on the rods 111 will effect the various positions of the crank axle 22 and the spindle 25 when the clevis 81 is against the stop 109. Since the plowing depth is dependent upon the position of the crank axle 22 and the spindles 25, the selected plowing depth can be reached merely by actuating the hydraulic mechanism to bring the clevis 81 against the stop 109 in whatever position has been selected by the slidable latch 112. This type of operation is convenient because the plowing depth will always be the same and no attention need be given to the plow when lowering it into working position.

While we have shown and described the preferred embodiment of the present invention it is to be understood that our invention is not to be limited to the specific structure thus shown and described but that, in fact, widely different means may be employed in the practice of the broader aspects of our invention.

What we claim, therefore, and desire to secure by Letters Patent is:

1. In a tractor propelled disk plow having a frame, a vertically movable axle and a swingable axle for carrying a front furrow wheel and a land wheel for movably supporting said frame oblique to the direction of travel of said plow, a torque shaft rotatably carried by said frame, a power motor carried by said frame and operable from said tractor for turning the shaft in one direction, means connecting one end of said shaft to said vertically movable axle for moving the axle vertically in response to the rotation of said shaft, means connecting the other end of said shaft to said swingable axle for moving said swingable axle in a direction opposite to the direction of movement of said shaft, said means including a bell crank swingably secured above said shaft, means for swivelly connecting one end of said bell crank to said swingable axle, and means interposed between the other end of said bell crank and said shaft for reversing the direction of rotation of said shaft as imparted to said bell crank.

2. In a tractor drawn disk plow having a frame, a series of axially aligned disks carried by said frame, a vertically movable axle and a swingable axle for carrying a front furrow wheel and a land wheel for movably supporting said frame oblique to the direction of travel of said plow, a torque shaft rotatably carried by said frame, a power motor carried by said frame and operable from said tractor for turning the shaft in one direction, means connecting one end of said shaft to said vertically movable axle for moving the axle vertically in response to the rotation of said shaft, means connecting the other end of said shaft to said swingable axle for moving said swingable axle in a direction opposite to the direction of movement of said shaft, said means including a bell crank swingably secured above said shaft, means for swivelly connecting one end of said bell crank to said swingable axle, means interposed between the other end of said bell crank and said shaft for reversing the direction of rotation of said shaft as imparted to said bell crank, and means for locking the rotation of said torque shaft with respect to said frame when said plow is in a transport position for permitting said power motor to be removed therefrom.

3. In a tractor propelled disk plow having a frame, a series of axially aligned disks carried by said frame, a vertically movable axle and a swingable axle for carrying a front furrow wheel and a land wheel for movably supporting said frame oblique to the direction of travel of said plow, a torque shaft rotatably carried by said frame, a power motor carried by said frame and operable from said tractor for turning the shaft in one direction, means connecting one end of said shaft to said vertically movable axle for moving said axle in response to rotation of said shaft, means connecting the other end of said shaft to said swingable axle for moving said swingable axle in a direction opposite to the direction of movement of said shaft, said means including a bell crank swingably secured above said shaft, means for swivelly connecting one end of said bell crank to said swingable axle, means interposed between the other end of said bell crank and said shaft for reversing the direction of rotation of said shaft as imparted to said bell crank, means for locking said torque shaft against rotation with respect to said frame when said plow is in a transport position for permitting said power motor to be removed therefrom, and means interposed in said means connecting one end of said shaft to said vertically movable axle for shifting said axle for independently adjusting said frame.

4. A disk plow having a supporting beam, a forwardly extending frame for carrying the beam, a land wheel and a rear furrow wheel for supporting one end of the beam, a front furrow wheel for supporting the other end of the beam, the wheels being vertically movable for changing the distance from said beam to the ground, ground engaging means carried by the beam for contact with the ground, a torque shaft rotatably carried by the frame forwardly of the beam and substantially co-extensive therewith, means connecting the respective ends of the torque shaft to the front furrow wheel and the land wheel for simultaneously vertically moving the wheels upon turning the torque shaft in one direction for raising the beam into a transport position, a power motor for turning the torque shaft in said one direction, a power motor support secured to said beam adjacent said front furrow wheel and to said frame and extending forwardly from said frame in a direction substantially normal to said torque shaft, said power motor support being readily attachable adjacent the forward end thereof to one end of said power motor, a rock arm fixed to said torque shaft adjacent one end thereof adjacent said power motor support and readily attachable adjacent the other end thereof to the other end of said power motor whereupon expansion of said power motor will turn said torque shaft in said one direction, the force exerted against said power motor support upon expansion of said power motor tending to swing said power motor support about its connection to the frame, that portion of the power motor support extending forwardly from the frame tending to swing in one direction and that portion of the power motor support extending between the frame and the beam tending to swing in an opposite direction whereby expansion of the power motor, so as to raise the beam, will exert an upward thrust upon the beam adjacent the front furrow wheel tending to balance the plow.

5. A disk plow having a supporting beam, a forwardly extending frame for carrying the beam, a land wheel and a rear-furrow wheel for supporting one end of the beam, a front-furrow wheel forwardly displaced from said beam for supporting the other end of the beam, the wheels being verticaly movable for varying the position of the beam with respect to the ground, ground engaging means carried by the beam for contact with the ground, a torque shaft rotatably carried by the frame substantially co-extensive with the beam, means connecting the torque shaft with the front-furrow wheel and the land wheel for simultaneously vertically moving the wheels upon turning of the torque shaft in one direction for raising said disk plow, a power motor for turning the torque shaft in said one direction, a power motor support secured to said beam adjacent said front-furrow wheel and to said frame and extending forwardly therefrom substantially normal to said torque shaft, said power motor support being readily attachable adjacent the forward end thereof to one end of said power motor, a crank arm on said torque shaft adjacent said power motor support and readily attachable to the other end of said power motor whereupon expansion of said power motor turns said torque shaft in said one direction, the rearward thrust of said power motor against said power motor support tending to pivot said power motor support about its connection to said frame so that the rearward portion of the power motor support upon expansion of the power motor will exert an upward thrust against said beam tending to substantially counteract the unbalanced nature of the beam.

6. In a disk plow of the type having a plurality of disks disposed in line and connected to be supported in transport from a frame, said frame being supported at one end on substantially symmetrically disposed ground engaging elements, and at the other end on a ground engaging element which is offset relatively to said frame whereby to introduce a moment into said frame tending to twist it in one direction, a torsion rod lying along said frame and connected with said ground engaging elements so as to raise said frame relatively thereto when said rod is rocked in one direction, and actuating means connected with said frame at the end adjacent the offset ground engaging element and connected also to said rod for rotating the same in a frame raising direction, said direction being so chosen that the reaction of said actuating means on said frame will introduce therein a twisting moment at said end adjacent said offset supporting element which moment is opposite in direction to that introduced into said frame by said offset ground engaging element whereby to substantially neutralize said twisting moment.

7. In an agricultural implement having a frame, axles shiftable on the frame at the ends thereof for raising and lowering movement of the frame, supporting wheels on the axles, and one of said axles being offset whereby its support introduces a twisting moment into said frame, a torque shaft rotatably supported on said frame generally parallel thereto and substantially coextensive therewith, a power actuated motor interconnected between said frame and said torque shaft adjacent said offset wheel axle and a connection between said shaft at the end remote from said motor for depressing the other axle in response to rotation of said shaft in one direction, said direction being the same as that in which said frame tends to twist by reason of its support from said offset axle, whereby said motor will tend to rotate the end of the frame in a direction opposite to the rotation of the shaft, and therefore opposite to the tendency of the frame to twist by reason of said offset support.

References Cited in the file of this patent

UNITED STATES PATENTS

| | | |
|---|---|---|
| 1,265,322 | Graham | May 7, 1918 |
| 1,619,904 | Wenndt | Mar. 8, 1927 |
| 1,928,952 | Silver | Oct. 3, 1933 |
| 1,931,815 | Conley | Oct. 24, 1933 |
| 2,280,846 | Pitcher | Apr. 28, 1942 |
| 2,392,006 | Silver | Jan. 1, 1946 |
| 2,448,469 | Rutter | Aug. 31, 1948 |
| 2,526,186 | Allen | Oct. 17, 1950 |
| 2,532,577 | Silver et al. | Dec. 5, 1950 |
| 2,538,093 | Goode | Jan. 16, 1951 |
| 2,555,554 | Miller | June 5, 1951 |
| 2,577,885 | Gay | Dec. 11, 1951 |
| 2,620,717 | Silver et al. | Dec. 9, 1952 |